July 21, 1931.  F. W. GAY  1,815,842
ELECTRIC TRANSFORMER AND SYSTEM OF DISTRIBUTION
Filed Nov. 1, 1927  5 Sheets-Sheet 1
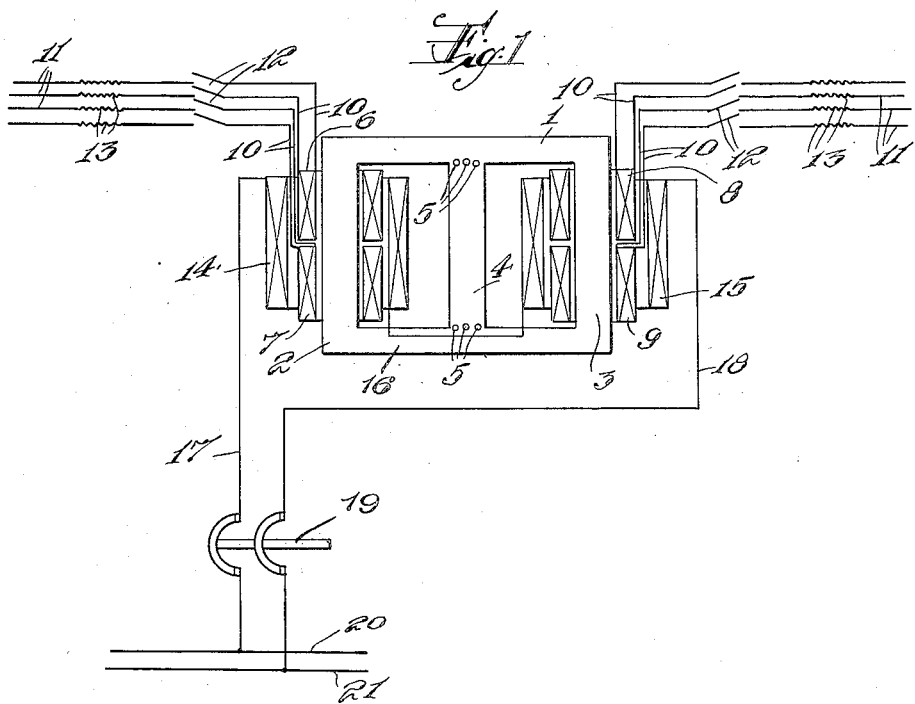
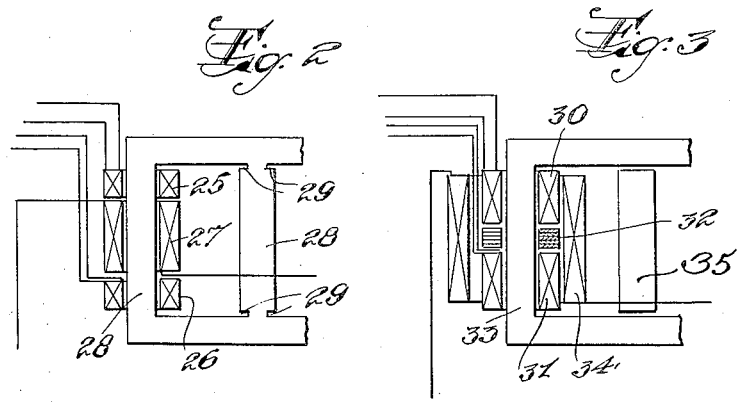
INVENTOR
Frazer W. Gay,
BY
George D. Richards
ATTORNEY July 21, 1931.  F. W. GAY  1,815,842
ELECTRIC TRANSFORMER AND SYSTEM OF DISTRIBUTION
Filed Nov. 1, 1927  5 Sheets-Sheet 2
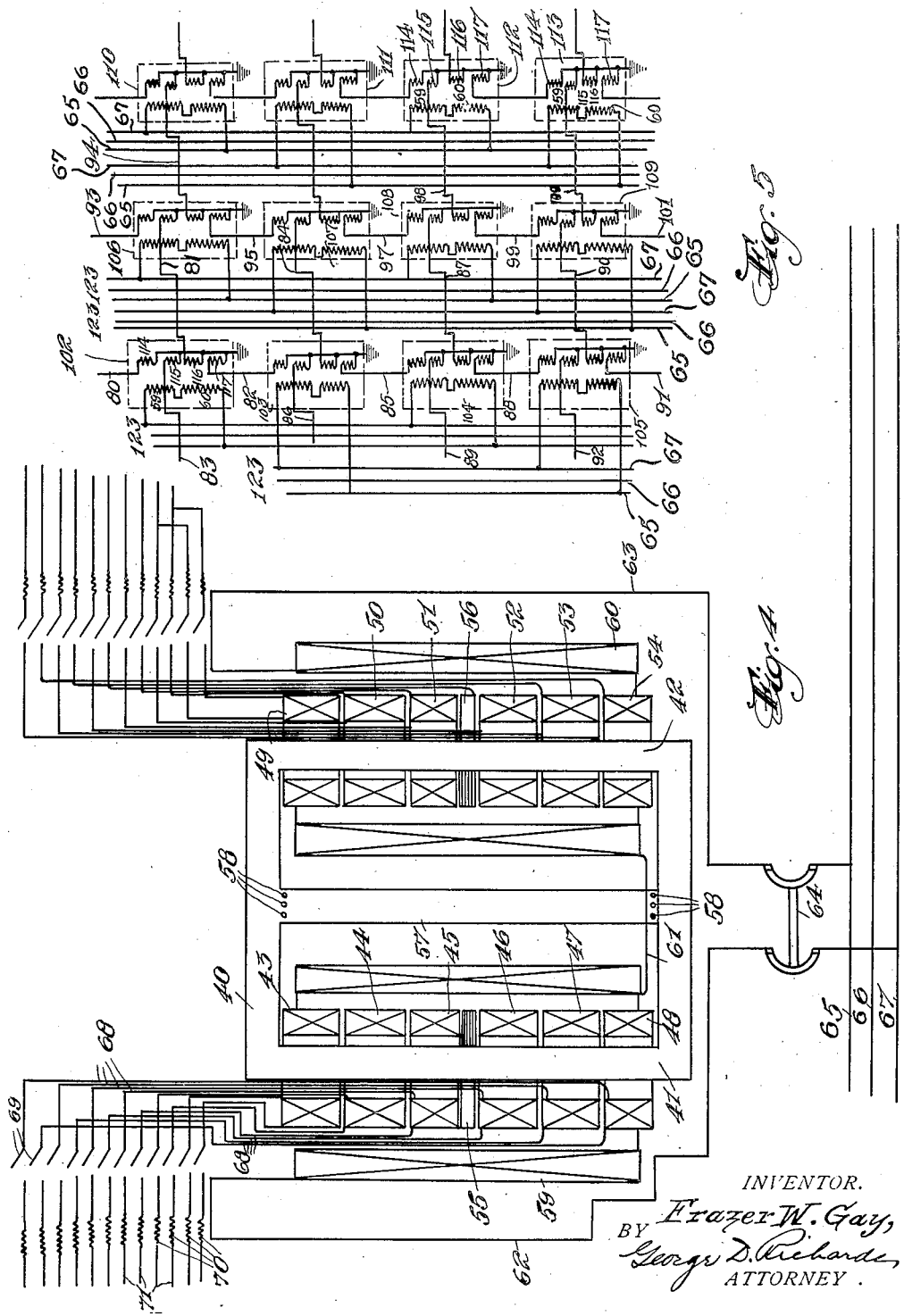
INVENTOR.
Frazer W. Gay,
BY George D. Richards
ATTORNEY.

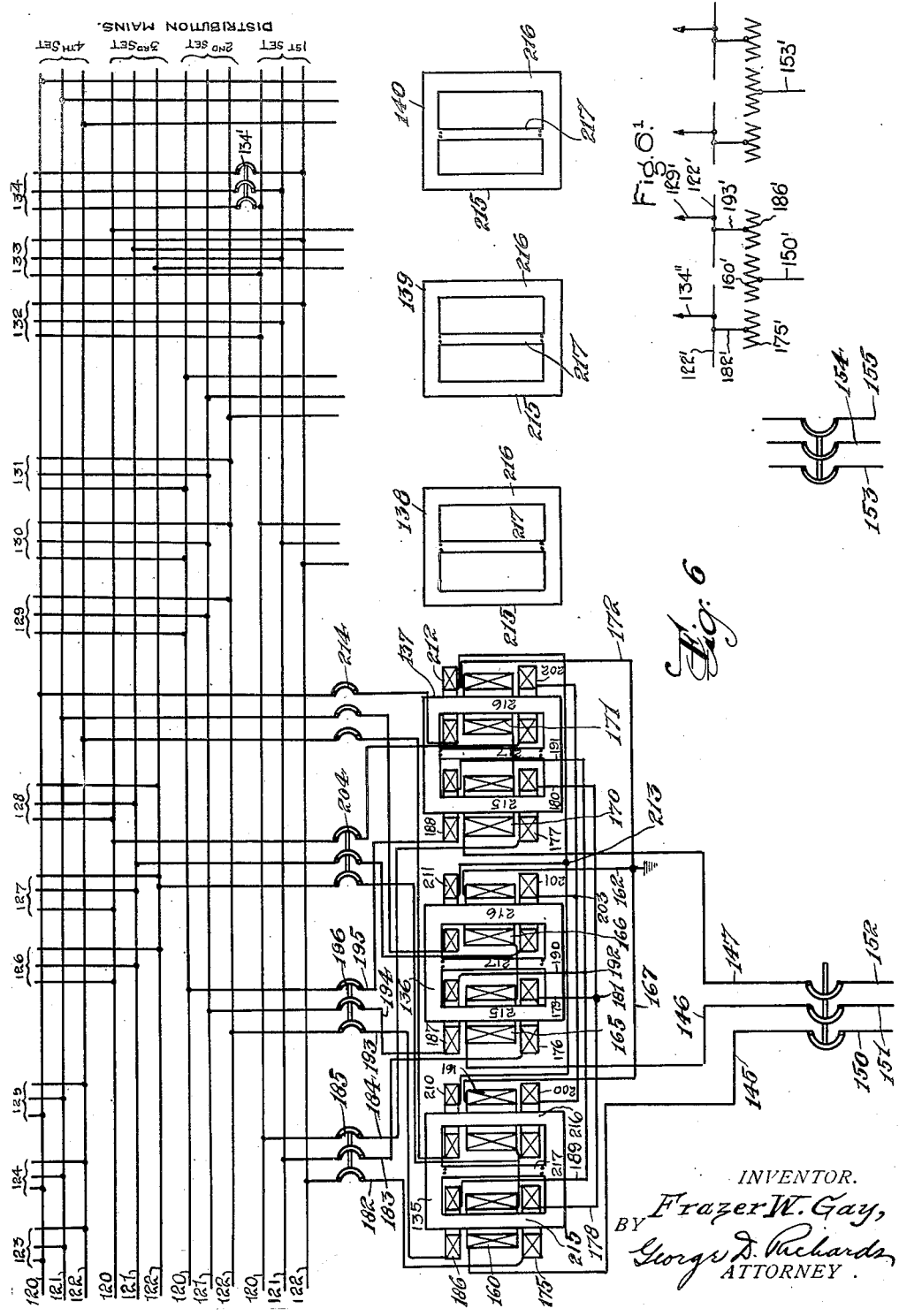

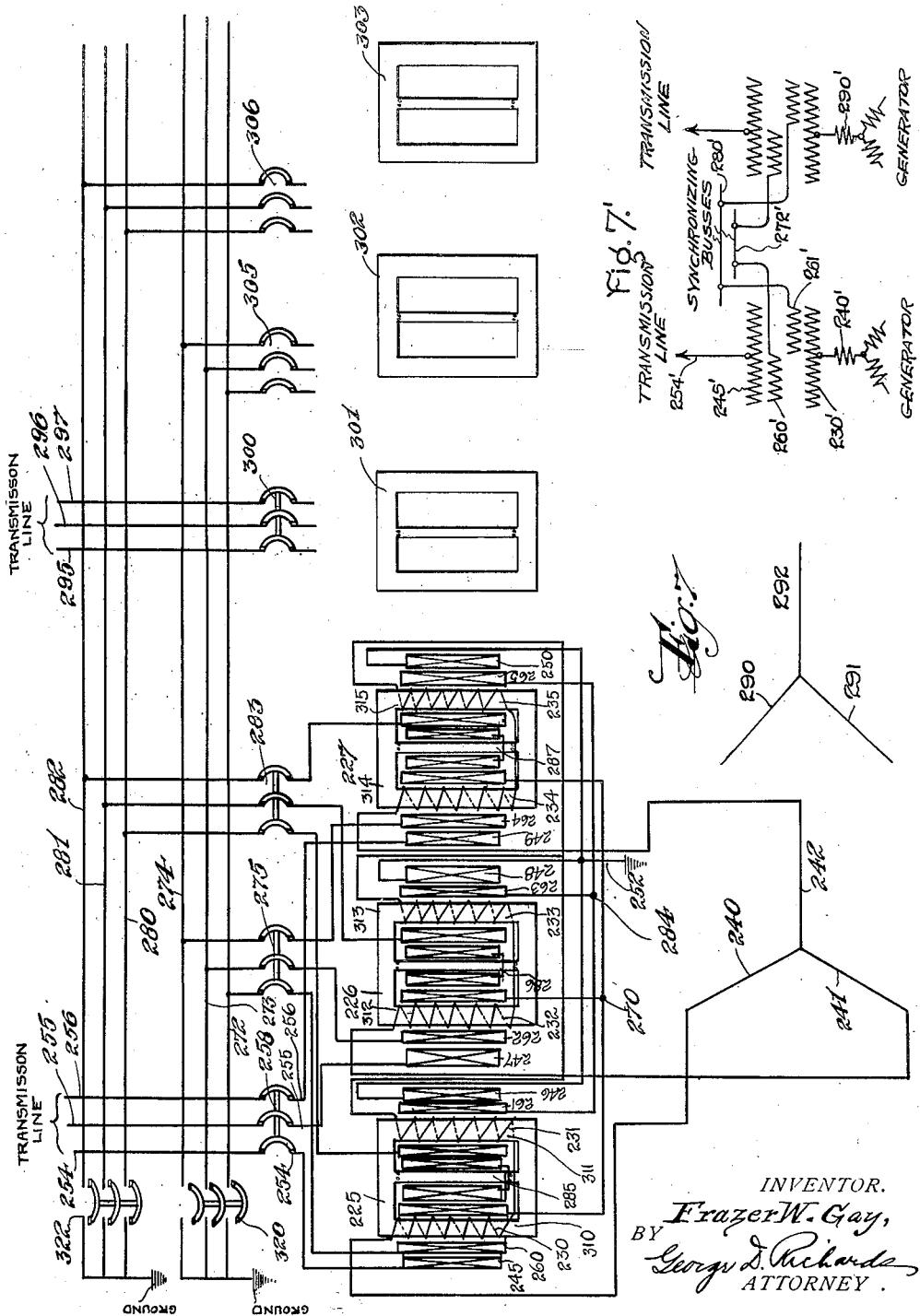

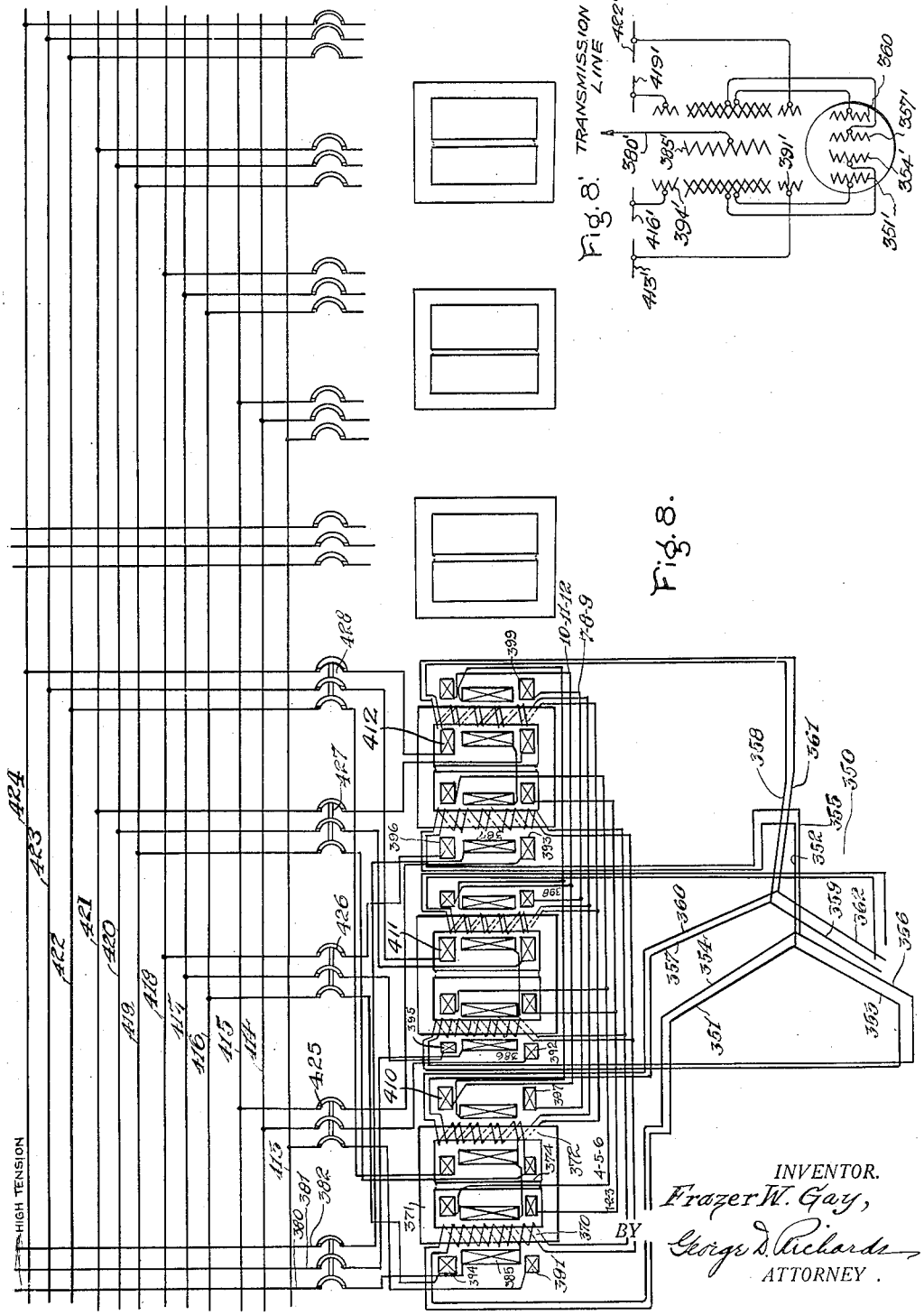

Patented July 21, 1931

1,815,842

UNITED STATES PATENT OFFICE

FRAZER W. GAY, OF NEWARK, NEW JERSEY, ASSIGNOR TO GENERAL ELECTRIC COMPANY, A CORPORATION OF NEW YORK

ELECTRIC TRANSFORMER AND SYSTEM OF DISTRIBUTION

Application filed November 1, 1927. Serial No. 230,227.

My invention relates to systems of electrical distribution and more particularly to transformers, transformer banks, and their arrangement and connection to generators, bus bars and supply lines in alternating current systems of distribution.

The invention has for a principal object to provide an arrangement of transformer means such that the flow of energy through the transformer means meets with a minimum of impedance provided said flow is in accordance with a predetermined plan but any flow of energy through said transformer means meets with a very great impedance provided such flow is not in accordance with said predetermined plan. Now the construction of power plants of great generating capacity and their interconnection results in the possibility of a very great energy drain being made if a short circuit comes on the system at a point close to the transmission net work. Such an energy drain causes a drop in voltage on the system and is a possible cause of unstable operation and in addition causes a great strain on any equipment that is called upon to rupture so great an amount of energy flowing from the system to the shorted circuit. In consequence both the low voltage and high voltage switches required to rupture short circuits on transformers connected directly to such high voltage net works are oversize and very expensive.

Points of power supply for the purposes of this specification may among others be grouped in three classes:

1. Isolated towns or other comparatively small users along the transmission line.
2. Switching stations feeding populous districts where large blocks of power are stepped down from the high voltage long distance transmission circuit to a lower voltage adapted to feed power over a radius of ten to twenty miles. These stations are generally equipped with 10 to 50 circuit breakers each controlling power on a radial feeder.
3. Generating stations or synchronizing points.

In a generating station it is desirable to synchronize a generator and tie it more or less solidly to the system.

At a synchronizing point it is desired to tie one or more systems together generally by means of two or more transformer banks.

The novel features which I believe to be characteristic of my invention are set forth with particularity in the appended claims, the invention itself, however, together with further objects and advantages thereof will be better understood by reference to the following description taken in connection with the accompanying drawings, in which:

Figure 1 is a diagrammatic representation of a simple embodiment of my invention shown partly in vertical section;

Figures 2 and 3 are similar views showing in part alternate modifications of the embodiment shown in Figure 1.

Figure 4 is a view similar to Figure 1 showing another modification;

Figure 5 is a diagram of group of transformer banks and system of distribution embodying the invention;

Figures 6, 7, 8 are diagrammatic showings of still other forms and modifications of embodiments of my invention in systems of supply and distribution; and Figures 6', 7' and 8' are simplified single-line schematic diagrams of the embodiment of my invention illustrated in Figures 6, 7 and 8 respectively.

Referring now to the drawings, Figure 1 illustrates somewhat diagrammatically a transformer suitable for carrying my invention into practice and comprises a closed core 1 having two winding supporting legs 2 and 3. A leakage path 4 in the form of a leg similar to 2 and 3 is arranged intermediate thereto and provided near each end with the openings 5, 5 formed therethrough to cut down the cross section of the leakage path for the purpose of increasing the reluctance thereof and producing saturation in said path 4 at predetermined unbalanced current value. The provision of the several groups of openings 5 tends to distribute the iron losses, and at the same time provides a maximum of accessibility to the centers of heat formed by the small iron sections between the openings whereby the cooling oil, in which transformers are usually immersed, may be most efficiently applied to the hot spots. On said legs 2, 3 are mounted the secondary coils 6 and 7, and 8 and 9 respectively each of which has a pair of leads 10, 10 for connection to the feeder busses 11, 11 with the disconnect switch 12 and blow-out fuse 13 in each feeder. Each of said secondary coils 6, 7, 8 and 9 are separate from each other and are separately insulated from each other as are also their respective pairs of feeders 10, 10. About said coils 6 and 7 and 8 and 9, respectively, are mounted the transformer primary coils 14 and 15 which are connected together by the lead 16. Leads 17 and 18 connect said primary coils 14 and 15 through the circuit breaker 19 respectively to the mains 20 and 21.

Each secondary winding 6, 7, 8 and 9 of the transformer as illustrated in Fig. 1 as well as each secondary winding in the other illustrated embodiments is arranged in close inductive relation with certain turns of its primary winding and in loose inductive relation with the remaining turns so that the impedance of each of the secondary windings is high with respect to the primary winding when only one secondary winding is loaded, whereas, when the secondary windings are dividing the distribution load in a predetermined ratio or uniformly the impedance of all of the secondary windings with respect to the primary winding is low. The effect being that with all of the secondary windings normally loaded close coupling is obtained with all of the primary winding. In the event of an abnormal load being imposed upon one of the feeders 11 due to short circuit or fault conditions, the impedance between the primary winding and the secondary winding associated with the faulty feeder becomes high to the fault current without appreciably affecting the reactance between the primary winding and the remaining secondary windings. The leakage path or leg 4, as illustrated in Fig. 1, is arranged to become more nearly saturated with a departure from the predetermined or uniform load distribution so as to change the value of the leakage flux produced by the current in the secondary windings by an amount disproportionate to the current flowing. As a result the voltage falls on the secondary winding subjected to the fault condition but rises on some of the other secondary windings but not proportionally to the fall in voltage on the winding subjected to short circuit conditions. It is to be noted, however, that the proper operation of my invention is obtained by the asymmetrical structural and electrical relation of each secondary winding with respect to the primary winding and that the introduction of magnetic leakage paths only intensifies the desired result where such magnification is found to be necessary. It will be clear that the circuit interrupting devices or fuses 13, 13, in the circuit of the secondary winding subjected to fault conditions will interrupt the circuit quickly and isolate the short circuited feeder.

In Figure 2 is shown an alternate transformer arrangement from that shown in Figure 1, and in which secondary coils 25 and 26 are mounted one at each end of a primary coil 27 on a core leg 28 instead of within the primary as in Figure 1. In this figure also is shown a flux leakage path 28, arranged midway between core legs, and with the sides thereof formed with notches 29, 29 at each end to produce flux saturation.

In Figure 3 is another alternate form in which the secondary coils 30 and 31 are separated by a magnetic path 32 in the form of a split ring preferably of iron or other good magnetic material which partially encircles the core leg 33 about which said coils 30 and 31 and a primary 34 are mounted. In this form the leakage path 35 is formed with an air gap between each end thereof and the core proper to secure high reluctance.

In both Figures 2 and 3 only one leg of the core and the coils thereof are shown, but the other leg and coils (and leakage ring in Fig. 3) are similarly arranged in each respective case.

In the use and operation of the embodiment of Figure 2 the characteristics and functions are substantially the same during normal operation and short circuit as in the form of Figure 1. In the embodiment of Figure 3 the said ring 32 will during a short circuit on coil 30 increase the leakage impedance or its impedance to load currents and so will aid in limiting the current in said coil 30.

It is to be understood that the number of secondary coils on each transformer core leg can be greater than two and that various arrangements of connections can be made other than herein shown.

In Figure 4 of the drawings is shown somewhat diagrammatically still another alternate form and arrangement of transformer and coils embodying the invention in which the closed core 40 has the two legs 41 and 42 on which are mounted the secondary coils 43, 44, 45, 46, 47 and 48, and 49, 50, 51, 52, 53 and 54, respectively. On said leg 41 between said coils 45 and 46 is mounted the split magnetic ring 55, and on leg 42 between coils 51 and 52 is mounted the split magnet ring 56. A leakage leg 57 is midway between legs 41 and 42 and has openings 58 therein to reduce the cross section to secure flux saturation at predetermined unbalanced current values. About said leg 41 and about said coils 43 to 48, inclusive, is mounted the high tension primary coil 59 and about said leg 42 and coils 49 to 54, inclusive, is the high voltage primary 60. A lead 61 connects coils 59 and 60; and leads 62 and 63 connect, through the circuit breaker 64, said primary coils 59 and 60, respectively, to the high tension mains 65 and 67 of the three phase mains 65, 66 and 67. Each of said secondary coils 43 to 54 inclusive, has a pair of leads 68, 68 which connect through respective cut out switches 69 and blow out fuses 70 to respective work circuit mains 71; except said coil 49 is connected in parallel with coil 50 to the same work circuit mains, to feed a higher capacity load than is connected to any of the other secondary coils. The functioning of this form of transformer and parts will be essentially the same as that of the transformer of Figures 1, 2 and 3 except that on short circuit of one of the coils, say coil 43, the voltage on the coils, 44 and 45 on the same leg, 41, and on the same side of the leakage ring, 55, will be much lower than normal, the voltage relations of the others being substantially as in those of Figures 1, 2 and 3, that is in coils 46, 47 and 48 the voltage and current will be slightly below normal and in coils 49 to 54, inclusive, the voltage and current will be somewhat above normal, during the period of short circuit.

In every case the current in the shorted secondary coil will be held down through the opposing magnetic fluxes to a value which can be handled by regular blowout fuses, and without the probability of destructive arcing in other parts of the circuit.

In Figure 5 there is shown a diagram of connections of transformers of the invention connected to a distribution system such as is now common in large cities. The conductors 80 to 101, inclusive, are single conductor cables running each in a block between corners and at each corner is indicated a transformer 102 to 113, inclusive, indicated diagrammatically by the rectangles made in dot and dash lines. Four cables are shown at each corner, as 80, 81, 82 and 83 at the first corner, and so on. The form of transformer illustrated in Figure 4 could be used in this system of distribution, for example, the coils 43, 44 and 45 of Figure 4 could be connected in multiple to form the winding 114 of transformers 102 to 113 of Figure 5, coils 46, 47, 48 to form coil 115, coils 49, 50, 51 to form coil 116, and coils 52, 53 and 54 to form coil 117, thereof. Said cables 80 to 101 connect these transformer secondary coils 114 to 117 in groups as shown in Figure 5 throughout the network, said cables, of course, each being adapted to be broken and tapped for connection to load. Six sets of high tension mains 65, 66 and 67 are shown with connections from alternate sets in pairs to alternate ones of said transformers 102 to 113, adjacent thereto, connection between these mains and the transformers being made to the transformer primary coils 59 and 60, as in Figure 4.

It is plain in both Figures 4 and 5 that not only will the currents that flow upon short circuit of a secondary circuit be held to a low value but also the mechanical forces within the transformer will be held to a reasonable value by such limitation of short circuit current.

In Figure 6 I have shown a three phase switching station having four sets of three phase distribution busses each comprising the lines 120, 121 and 122. Each set of said mains is electrically insulated from the other sets and feeds its energy to three phase feeder circuits as 123, 124 and 125 for one set of distribution mains 126, 127 and 128 for another; 129, 130 and 131 for another, and 132, 133 and 134 for the other. These busses receive their energy from the secondaries of three phase transformer banks as the bank transformers 135, 136 and 137 and bank 138, 139 and 140. The windings for bank 138, 139 and 140 are not shown but are identical with those shown for bank 135, 136 and 137. The three phase primary leads 145, 146 and 147 of bank 135, 136 and 137 are connected to the corresponding phase leads of high voltage transmission mains 150, 151 and 152 and the three phase primary leads of bank 138, 139 and 140 are connected to the corresponding phase leads of high voltage transmission mains 153, 154 and 155. The two high tension coils 160 and 161 of transformer 135 are connected in series and the coil 160 is connected to the high tension lead 145 while the coil 161 is connected to the grounded neutral 162. Similarly coils 165 and 166 are suitably connected in series and connected respectively to the main 146 and to the grounded neutral 167; and coils 170 and 171 are suitably connected in series and connected respectively to the main 147 and to the grounded neutral 172 to form a star connected grounded neutral winding.

Similarly located secondary coils as 175, 176 and 177 each have one of their leads 178, 179 and 180, respectively, connected to the neutral point 181 and thereby are connected to form a three phase secondary circuit. The respective other leads 182, 183 and 184 of three phase circuit comprising said coils 175, 176 and 177 are connected to the first set of distribution mains 120, 121 and 122 through the circuit make and break device 185. In the same manner coils 186, 187 and 188 are connected through respective leads 189, 190 and 191 to neutral 192 and to the second set of mains 120, 121 and 122 through respective leads 193, 194 and 195 and circuit make and break device 196. Also the similarly located coils 200, 201 and 202 are connected to neutral 203 and to the third set of distribution bus lines 120, 121, 122 through circuit make and break device 204, and coils 210, 211 and 212 are connected to neutral 213 and to the fourth set of mains 120, 121 and 122 through circuit make and break device 214. Magnetic legs 215 and 216 have a leakage path 217 having a high reluctance section formed as in the core in Figure 1. Transformers 136 and 137 have similar paths 217.

In Figure 6' I have shown a simplified single-line, single-phase, schematic diagram of the embodiment of my invention illustrated in Figure 6, in order to render the arrangement more easily understood after a cursory examination of the drawings. In this figure 150' represents conductors of the circuit 150, 151, and 152, and winding 160' represents a winding of the three primary windings in circuit with primary winding 160. Similarly 175' represents the secondary windings comprising windings 175, 176 and 177 on the lower half of the left-hand leg of each of the transformer cores as viewed in Figure 6 which are connected to conductors 182, 183 and 184 represented in the simplified diagram by the conductor 182'. Conductor 182' is connected to a bus section 122' indicated in Figure 6 as viewed in the drawings by the lower three phase bus bars 120, 121 and 122. The three phase feeder 134 is represented by the conductor 134'. Similarly, 186' represents the secondary windings corresponding to the windings 186, 187 and 188 on the upper half of the left-hand legs as viewed in the drawings of the transformers 135, 136 and 137; 193' represents the circuit corresponding to the conductors 193, 194 and 195 and 122' represents the bus comprising conductors 120, 121 and 122 which are arranged to supply feeder 129 indicated by conductor 129'. The second bank of transformers is similarly indicated with respect to the primary windings, secondary windings, busses and feeders, and this entire section of the schematic diagram is identified by the circuit 153'.

The operation of this transformer bank is similar to the operation of the transformer shown in Figures 1 to 4. Now each feeder as for instance 134 is connected to its bus line as 120 by means of the customary individual make and break device conventionally illustrated by 134'. This device may be closed and opened at will. Now between the time when a short circuit occurs on the feeder 134 and the opening of its circuit breaker 134' either automatically or by hand a period usually of several seconds duration occurs. During the existence of the short circuit it is desirable to obtain the following conditions:

1st. The voltage or feeders 182, 183, 194, 195 and so on be disturbed as little as possible.

2nd. That the energy flowing to the short circuited feeder be held to a relatively low value in order to (a) prevent excessive current and consequent damage at the point of short circuit, (b) render the duty placed on the circuit breaker in feeder 134 relatively easy.

My invention accomplishes these results as follows. A short circuit on feeder 134 is a short circuit on the first set of distribution bus lines 120, 121 and 122 until the feeder circuit breaker 134' opens. A short circuit on the first set of bus lines is a short circuit on the three phase winding consisting of coils 175, 176 and 177 until circuit breaker 185 opens. Circuit breaker 134' is set to operate before breaker 185 so that the latter will not normally operate but will act as a back up breaker. Now when coils 175, 176 and 177 are short circuited the magnetic flux will fall in value in legs 215, 215, 215, of this bank and rise in legs 216, 216, 216 thereof as previously explained under Figures 1 and 4. Also leakage flux will reach a high value in leakage paths 217, 217 and 217. Also as previously explained the demagnetizing ampere turns in coils 175, 176 and 177 will be greatly in excess of the magnetizing turns in the lower half of coils 160, 165 and 170. It is thus seen that if feeder 134 becomes short circuited the voltage will tend to fall slightly on the second set of distributor mains and to rise considerably on the third and fourth sets during the short circuit. In other words the voltage on the first set largely vanishes and is partly absorbed by an impedance drop in coils 175, 176 and 177 and the high voltage coils but a large part of this voltage drop appears as an increased voltage across the third and fourth sets of distribution mains during the moment of short circuit. It is only that smaller part of the total voltage of the first set of mains that is absorbed in the impedance drop in coils 175, 176 and 177; the first set of mains and shorted feeder 134 that is effective in producing current in the shorted circuit. While my invention effectively limits the energy flowing into a short circuit, it at the same time allows the transformer to be designed with low impedance so that the voltage regulation with a flow of energy distributed according to the predetermined plan is much better than in the usual construction. In the usual construction the impedance of the transformer to normal flow of power is generally made high since this same impedance is largely relied upon to limit the short circuit occuring upon any bus to which it is connected. I have shown four busses or four sets of three phase distribution lines 120, 121 and 122 but it is very evident that a greater current limitation can be had if more busses are used. This feature lends itself nicely to modern practice since usually only three to five feeders are placed on a bus and if the station feeds out a very great amount of energy then a relatively large number of busses will be used. It is very evident that tertiary windings may be connected if desired. In Figure 6 I show only two sets of incoming lines 150, 151 and 152, but it will occur to those skilled in the art that more lines and transformer banks may be used without departing from my invention in its broader aspects. It is also very evident that the synchronizing power exerted through the transformer on these lines by reason of their parallel operation on the secondaries is quite as great as or greater than with the conventional method of feeding power to switching stations because of the low transformer impedance allowable and in fact is much greater in the case of large stations since in such stations as now built it would be found necessary to put reactors between the various transformer secondaries, and the lines would not have great synchronizing power through the transformers and secondary reactors. In such a station as now built great synchronizing ability could only be obtained by tying the lines together on the high side and then large size high tension oil circuit breakers would be required since common practice requires that all large switching stations receive power from two separate sources such as from two separate generating stations or a generating station and a system interconnection to a neighboring utility.

In Figure 7 I have shown my invention applied to three transformers 225, 226 and 227 in a three phase bank in a generating station. The respective pairs of primary coils 230, 231; 232, 233; and 234, 235 of the three phase transformer bank are series connected on each transformer and the transformers connected to each other to form circuits which are star connected and the primary terminals of the star connection are connected to the terminals of the turbo generator winding 240, 241 and 242. The respective high voltage coils on each transformer 245 and 246; 247 and 248; and 249 and 250 are connected in series and the circuit on each transformer so formed is connected at one end to the grounded neutral 252 and at the other end to high voltage terminal leads 254, 255 and 256, respectively through the circuit make and break device 258. Each transformer has a tertiary winding used for synchronizing consisting of two separately insulated coils 260 and 261 for transformer 225, 262 and 263 for transformer 226; and 264 and 265 for transformer 227. One end of each of coils 260, 262, and 264 is suitably connected to a neutral point 270 to form a three phase tertiary circuit with respective opposite ends of said coils 260, 262 and 264 connected to the synchronizing mains 272, 273 and 274 by means of the circuit make and break device 275. Similarly the coils 261, 263 and 265 are connected to form a three phase tertiary circuit connected to respective ones of the synchronizing bus mains 280, 281 and 282 through circuit make and break device 283 and to a neutral 284. Leakage paths 285 in transformer 225; 286 in transformer 226; and 287 in transformer 227 are each reduced in cross section to provide high reluctance paths as above described. A generator 290, 291 and 292 similar to 240, 241, 242 feeds a transmission line 295, 296, 297 through make and break device 300 by means of transformer bank 301, 302 and 303 (windings not shown). This second bank has windings exactly like bank 225, 226, 227 and its separately insulated tertiary windings feed bus lines 272, 273 and 274; and 280, 281 and 282 through make and break devices 305 and 306.

In Figure 7' I have shown a simplified single-line, single-phase schematic diagram of the embodiment of my invention illustrated in Figure 7, in order to facilitate an understanding of my invention from a cursory inspection of the drawings. In this figure 240' represents the windings of the generators 240, 241 and 242; 230' represents the primary windings 230, 231; 232, 233; 234, 235, and 245' represents the secondary windings 245, 246; 247, 248; and 249, 250 which are connected to the transmission line comprising the conductors 254, 255 and 256 indicated by conductor 254'. Winding 260' represents the tertiary windings 260, 262 and 264, which are connected to the station or synchronizing bus indicated by the lower bus as viewed in Figure 7 comprising conductors 272, 273 and 274 and identified in this figure as 272'. Winding 261' represents another tertiary winding comprising the windings 261, 263 and 265 which are connected to another station or synchronizing bus indicated by the upper bus as viewed in Figure 7 comprising conductors 280, 281 and 282 and identified in this figure as 280'. The second bank of transformers is similarly indicated with respect to primary windings, secondary windings, tertiary windings, busses and transmission lines, and this entire section of the schematic diagram is identified by the winding 290'.

The operation of a transformer bank and the apparatus and parts is as follows: Generator 240, 241, 242 normally feeds its energy to line 254, 255, 256. In case line 254, 255 and 256 is not heavily loaded part of the energy generated by generator 240, 241, 242 is fed to the busses 272, 273, 274 and 280, 281, 282 and from them to a heavily loaded line as for instance 295, 296, 297. Now if by chance one of the generator bus lines 272, 273, 274 or 280, 281, 282 should become short circuited then the voltage on the other bus line will go to substantially twice normal but the flow of energy from generator 240, 241, 242 to bus line 272, 273, 274 and bus line 280, 281, 282 will not be greatly disturbed. The action of the transformer is as follows: When bus line 272, 273, 274 becomes short circuited the voltage across coils 260, 262, 264 falls to substantially zero and the current in coils 260, 262, 264 rises somewhat above the vector sum of the current in coils 230 and 245. In consequence practically all the flux is driven out of the magnetic leg 310 and into the leakage path 285. Since with the drop in flux in leg 310 the voltage has largely vanished in coil 230 a larger mangetizing current will at once flow from the generator and this large magnetizing current will substantially double the magnetic flux in the leg 311 and leakage path 285. This large magnetizing current in coil 230 will be offset by a corresponding demagnetizing current in the short circuited coil 260 and there will be very little magnetic flux in the leg 310. In the same manner it can be shown that the magnetic flux in 313 and 315 is substantially doubled by the short circuit on bus lines 272, 273 and 274 and the magnetic flux in 312 and 314 is reduced to a small value. It is thus seen that a short circuit on bus lines 272, 273, 274 substantially doubles the voltage on the coils located on the legs 311, 313, 315 and substantially reduces to nil the voltage of coils located on legs 310, 312, 314. Thus the generator windings 230—231; 232—233; 234—235, and high voltage windings 245—246; 247—248; and 249—250 being half on 230, 232 and 234 respectively, and half on 231, 232 and 233 respectively maintain substantially constant voltage while the voltage on the three phase circuit of coils 260, 262, 264 vanishes and on three phase circuit of coils 261, 263, 265 doubles. I have shown a make and break device 320 connected to short and ground on said bus lines 272, 273 and 274; and a make and break device 322 connected to short and ground on said bus lines 280, 281 and 282. These devices may be used to short and ground each conductor of a bus line for cleaning or in case of trouble on that bus if desired. Now it is very evident that winding 230—231; 232—233; 234—235, may be omitted without interferring with the functioning of my invention since in this case energy would flow from the bus or busses direct to lines 254, 255, 256 or vice versa and the transformer would act as a step up from station voltage to transmission voltage. It is also evident that windings 245—246; 247—248; 249—250 may be omitted without interferring with the functioning of my invention. In this case the generator would feed its entire generated energy into the bus or busses. It is not necessary that the leakage paths 285, 286, 287 have high reluctance sections as described but these high reluctance paths serve this useful purpose that they tend to keep the flux uniform in legs 310 and 311, etc., and tend to keep the voltage equal on bus lines 272, 273, 274 and 280, 281, 282. Now it is evident that with the high reluctance sections in said leakage paths 285, 286, 287 that if there are many transformer banks similar to 225, 226, 227 and 301, 302, 303 connected to busses 272, 273, 274 and 280, 281, 282 then the increase in current in a short circuited bus (and this increased current is the current that must flow in the short circuited path) produced by the short circuit is considerable. In other words the tendency of the bus to maintain its voltage increases with the number and size of transformer banks connected and with the reluctance of the leakage paths such as leakage path 285. The value of the use of leakage paths may be shown as follows: If many generators are on the busses and it is desired to synchronize generator 240, 241, 242 then that generator may be quickly brought into synchronism by closing make and break device 275 and bus 272, 273, 274 will be able to hold the machine in synchronism until 283 is closed. On the other hand if the operator connects generator 240, 241, 242 out of synchronism with the bus and short circuits bus 272, 273, 274 he can open breaker 275 and he will only have shifted voltages between 272, 273, 274 and 280, 281, 282. He will not have imposed a short circuit on the entire system.

In Figure 8 I have shown a preferred form of my invention. Generator 350 is shown diagrammatically having four separately insulated windings 351, 352, 353; 354, 355, 356; 357, 358, 359 and 360, 361 and 362. Windings 351, 352 and 353 and 354, 355, 356 are shown generating E. M. F. of common time phase, while 357, 358, 359 and 360, 361, 362 also generate E. M. F. of common time phase but E. M. F. time phase of 351, 352, 353, 354, 355, 356 is slightly different from E. M. F. time phase of 357, 358, 359; 360, 361, 362. It is therefore evident that magnetic flux in leg 370 of transformer 371 normally has the same value as magnetic flux in leg 372 of the same transformer but has slightly different time phase, the vector difference in fluxes in leg 370 and leg 372 passes through the leakage path 374. Each three phase generator winding feeds a three phase transformer winding in separately insulated relation. A three phase high tension line 380, 381, 382 is fed by the three phase high tension winding 385, 386, 387 as fully explained in my patent application Serial No. 224,811, filed October 8, 1927 and assigned to the same assignee as this application. The transformer impedance to energy flowing directly from generator to high tension line is made low. A transformer having four separatively insulated windings 391, 392, 393; 394, 395, 396; 397, 398, 399; 410, 411, 412, is shown connected respectively to busses 413, 414, 415; 416, 417, 418; 419, 420, 421; and 422, 423, 424, through circuit make and break devices 425, 426, 427 and 428.

In Figure 8' I have shown a simplified single-line, single-phase schematic diagram of the embodiment of my invention illustrated in Figure 8. In this figure 351' represents the separately insulated generator winding 351, 352 and 353, and 354' represents the separately insulated generator winding 351, 352 and 353, and 354' represents the separately insulated generator windings 354, 355 and 356. Each of these generator windings is connected to separately insulated transformer windings wound on the left-hand leg as viewed in Figure 8, of the transformers. Similarly 357' represents the separately insulated generator windings 357, 358 and 359 which are of slightly different time phase from 351, 352 and 353; and 360' represents the separately insulated generator windings 360, 361 and 362. The windings 357' and 360' are connected to separately insulated transformer windings on the right-hand leg as viewed in Figure 8. The high voltage secondary windings 385, 386 and 387 are represented by winding 385' which is connected to the transmission line 380, 381, and 382 represented by conductor 380'. The secondary windings 391, 392 and 393 positioned on the lower portion of the left-hand leg as viewed in Figure 8 are represented by winding 391' and connected to the bus comprising conductors 413, 414 and 415 and indicated by the bus 413'. Similarly the secondary windings 394, 395 and 396 positioned on the upper portion of the left-hand leg as viewed in Figure 8 are represented by winding 394' and connected to the bus comprising conductors 416, 417 and 418 and indicated by the bus 416'. The relation and identification of the secondary windings on the upper and lower portion of the right-hand leg of the transformers of Figure 8 will be clear from an inspection of the drawings by their connection to the busses 419' and 422' respectively.

Now it will be clear from explanations previously made that bus lines 413, 414, 415 for instance may be short circuited with substantially the following results. Voltage across coils 391, 392, 393 will fall to nearly zero and currents in these coils will greatly increase also currents in generator windings 351, 352, 353; 354, 355, 356 will increase and thereby flux in coils 394, 395, 396 will tend to be increased, this tendency to increased flux will be largely offset by an impedance drop in the generator windings 351, 352, 353; 354, 355, 356. Voltages on busses 416, 417, 418, 419, 420, 421 and 422, 423, 424 will not vary greatly. Current in coils 391, 392 and 393 will be held down by reason of the very great impedance to energy flowing from said generator windings 351, 352, 353; 354, 355, 356, to coils 391, 392 and 393 and the almost infinite impedance to energy flowing from generator windings 357, 358, 359; 360, 361, 362, to coils 391, 392, 393. The relatively great mechanical spacing between said coils 391, 392, 393; 394, 395, 396 and coils 351, 352, 353; 354, 355, 356, and the presence of leakage paths 374, 375, 376 promote this high impedance. The high reluctance sections in said leakage paths 374, 375, 376 if used tend to maintain voltage uniform on all busses.

The leakage path is not necessary in all cases and in fact in most cases, and the transformer can be made with the shell type as well as in the core type of magnet path.

The above explanation is intended merely as explanatory and it will be evident to one skilled in the art that many deviations from the drawings and specification are possible without departing from the principles shown above. One of the most fruitful fields of development is expected to be in switching stations used for the inter connection of two or more great systems. The problem involved in such a station is one of allowing a free flow of energy from one system to another when the energy is distributing itself in accordance with a prearranged plan but interposing a very great impedance to a great flow of energy when such flow is not in accordance with said plan but is concentrated on say one transmission line.

I am fully aware, that changes may be made in the general arrangement of the various windings and other parts of the transformer, and in the connections in the transmission and feed lines, without departing from the spirit of the invention, as set forth in the foregoing specification, and shown in the drawings, and as defined in the appended claims.

I claim:—

1. In combination, a supply circuit, a plurality of load circuits, and a transformer having a primary winding connected to said supply circuit and a plurality of separately insulated secondary windings each connected to a different load circuit, each of said secondary windings being wound in close inductive relation with certain turns of said primary winding and in loose inductive relation to the remaining turns of said primary winding and to each other so that for a predetermined distribution of load in all of said secondary windings the impedance thereof is low with respect to said primary winding and comparatively great to a distribution of load different from said predetermined distribution of load.

2. In combination, a supply circuit, a plurality of load circuits, and a transformer provided with a core and having a primary winding uniformly distributed over said core and connected to said supply circuit and having a plurality of separately insulated and mechanically grouped secondary windings on said core, each of said secondary windings being connected to a different load circuit and in close inductive relation with certain turns of said primary winding and in loose inductive relation to each other and to the remaining turns of said primary winding which latter turns are so disposed with respect to said core as to promote flux leakage around said remaining turns for currents flowing therein when some of said secondary windings are supplying an abnormal current to load circuits connected thereto so that for a uniform distribution of load on said separately insulated secondary windings the impedance thereof is low with respect to said primary winding and comparatively great to an abnormal current flowing in a restricted number of said separately insulated secondary windings.

3. In combination, a plurality of load circuits, a plurality of bus sections each connected to energize separate load circuits, and transforming means interconnecting said bus sections and having a plurality of separately insulated windings in loose inductive relation to each other and each connected to different bus sections, and an additional winding having certain turns in close inductive relation to each of said separately insulated windings and its remaining turns in loose inductive relation with each of said separately insulated windings whereby said remaining turns will act as high reactive turns to disproportionate abnormal loads in said separately insulated windings.

4. In a system of distribution, a plurality of bus sections, a plurality of distribution circuits each connected to a different bus section, and transforming means having a core and a primary winding thereon and a plurality of separately insulated secondary windings mechanically and electrically asymmetrically positioned with respect to said primary winding and each connected to an adjacent bus section for interconnecting said sections and for transferring power between said sections during any abnormal power demand on any one distribution circuit.

5. In combination, a bus bar including two sections, a separately insulated distribution circuit connected to each bus section, and means comprising a transformer having a single primary winding and separately insulated secondary windings connected respectively to different bus sections and each being wound in close inductive relation to certain turns of said primary winding and in loose inductive relation to the remaining turns of said primary winding and to each other so that there is introduced a low impedance with respect to said primary winding for equal loads in said distribution circuits and a comparatively high impedance to an abnormal current flowing in any one of said distribution circuits.

6. In a system of distribution, a supply circuit, a plurality of power circuits in separately insulated relation, and a transformer having a primary winding connected to said supply circuit and a plurality of secondary windings connected respectively to different power circuits, said secondary windings being mechanically spaced and in such inductive relation with respect to said primary winding and to each other that the impedance to the flow of energy for a predetermined distribution of load in said power circuits is relatively low but when said flow of energy is different from said predetermined distribution of load the impedance is substantially higher.

7. In a system of distribution, a supply circuit, a plurality of individual power circuits in separately insulated relation, and a transformer having uniformly distributed series connected primary windings connected to said supply circuit and a plurality of secondary windings in separately insulated relation and connected respectively to different power circuits, said secondary windings being mechanically spaced and in such inductive relation with respect to said primary winding that the impedance to the flow of energy when uniformly distributed in said power circuits is relatively low but when said flow of energy is confined principally to a single secondary winding the impedance is substantially higher.

8. In a system of electrical distribution, a set of mains adapted to be connected to a source of alternating current; a plurality of transformers each comprising a closed core having a pair of winding legs, a leakage path arranged in symmetrical relation with said legs, a primary winding on said core consisting of a coil on each said leg and connected in series with each other and connected to said mains and a secondary winding on each of said legs, each of said secondary windings comprising a plurality of separately insulated coils; connection from one side of each of said separately insulated secondary coils to ground; and connection from the other side of each of said separately insulated secondary coils through a work circuit to one of the separately insulated secondaries on another of said transformers.

9. In a system of distribution, a source of alternating current having a predetermined frequency, a synchronous dynamo-electric machine, a distribution circuit, and a transformer having a winding connected to said synchronous machine, and a second winding connected to said distribution circuit, and a third winding so connected to said source of alternating current and inductively associated with said first and second transformer windings that said synchronous machine may be synchronized with said source of alternating current, said transformer having a magnetic path arranged to approach magnetic saturation for rendering the impedance of said third winding low to currents therein below a predetermined value and comparatively high to currents therein above a predetermined value.

10. In a system of distribution, a distribution circuit, a synchronizing bus, a synchronous dynamo-electric machine having a plurality of separately insulated windings, a transformer having a plurality of separately insulated windings each connected to and arranged to receive energy from the dynamo-electric machine winding associated therewith, a second winding connected to said distribution circuit, and a third winding arranged to be connected to said synchronizing bus.

11. In a system of distribution, a transmission circuit, a plurality of separately insulated synchronizing bus lines, a synchronous alternating current generator, and a transformer having a primary winding connected to said generator, a secondary winding connected to said transmission circuit, and a plurality of separately insulated tertiary windings equal in number to said synchronizing bus lines and each connected to a different synchronizing bus line.

12. In a system of distribution, a transmission circuit, a plurality of separately insulated synchronizing bus lines, a synchronous alternating current generator, and a transformer having a primary winding connected to said generator, a secondary winding connected to said transmission circuit, and a plurality of separately insulated tertiary windings equal in number to said synchronizing bus lines and each connected to a different synchronizing bus line, said tertiary windings being so inductively and mechanically related to said primary winding that the impedance to the flow of a uniformly distributed current in said tertiary windings is low but comparatively high when current is confined principally to a single tertiary winding.

13. In a system of distribution, a source of alternating current, a power transmission circuit, a synchronizing bus, and a transformer having a primary winding connected to said source of alternating current, a secondary winding connected to said transmission circuit, and a tertiary winding connected to said synchronizing bus, said windings of said transformer being so inductively arranged with respect to each other that the impedance offered to the flow of energy from said source of current to said power circuit is relatively low and the impedance offered to the flow of energy in either direction between said source of current or said power circuit and said synchronizing bus is relatively great.

14. In a system of distribution, a power station including a generator, a plurality of separately insulated station busses, a power transmission circuit, and a transformer having a primary winding connected to said generator, a secondary winding connected to said power circuit and a plurality of separately insulated tertiary windings each connected to a different station bus, said windings of said transformer being so mechanically spaced and inductively related to each other that the impedance offered to a flow of energy from said geenrator to said power circuit is relatively low but relatively higher to a uniform flow of energy from said generator through said secondary winding to all of said tertiary windings or from said generator directly to said tertiary windings and comparatively very much higher when said flow of energy is concentrated through a single tertiary winding.

15. In a system of distribution, a transmission circuit, a synchronizing bus, a synchronous dynamo-electric machine having a plurality of separately insulated circuits, a transformer having a primary winding connected to said generator, a secondary winding connected to said transmission circuit, a separately insulated tertiary winding connected to said synchronizing bus, and means for producing a magnetic leakage path in said transformer for limiting the energy flow to and from said synchronizing bus.

In testimony that I claim the invention set forth above I have hereunto set my hand this 31st day of October, 1927.

FRAZER W. GAY.